United States Patent
Takahashi

(10) Patent No.: US 11,418,670 B2
(45) Date of Patent: Aug. 16, 2022

(54) PRINTING APPARATUS CONNECTED TO AN EXTERNAL POWER SUPPLY HAVING A PLURALITY OF VOLTAGE INFORMATION

(71) Applicant: BROTHER KOGYO KABUSHIKI KAISHA, Nagoya (JP)

(72) Inventor: Hiromasa Takahashi, Gamagori (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/206,143

(22) Filed: Mar. 19, 2021

(65) Prior Publication Data

US 2021/0344810 A1    Nov. 4, 2021

(30) Foreign Application Priority Data

Apr. 30, 2020  (JP) .............................. JP2020-080244

(51) Int. Cl.
 *G06F 3/12* (2006.01)
 *H04N 1/00* (2006.01)

(52) U.S. Cl.
 CPC ..... *H04N 1/00904* (2013.01); *H04N 1/00896* (2013.01); *H04N 1/00901* (2013.01); *H04N 1/00907* (2013.01)

(58) Field of Classification Search
 CPC .......... H04N 1/00904; H04N 1/00896; H04N 1/00901; H04N 1/00907
 USPC ................................................. 358/1.1–1.18
 See application file for complete search history.

(56) References Cited

U.S. PATENT DOCUMENTS

| | | | |
|---|---|---|---|
| 8,587,825 B2* | 11/2013 | Poole | G06F 3/1286 358/1.9 |
| 2019/0196565 A1* | 6/2019 | Shimamura | H02J 7/00 |
| 2019/0199884 A1* | 6/2019 | Shimamura | H04N 1/00888 |
| 2019/0238706 A1* | 8/2019 | Sakai | H04N 1/00907 |
| 2020/0257345 A1* | 8/2020 | Wang | G06F 1/266 |
| 2021/0377414 A1* | 12/2021 | Soma | H04N 1/00888 |

FOREIGN PATENT DOCUMENTS

JP        2019-97107 A    6/2019

* cited by examiner

*Primary Examiner* — Gabriel I Garcia
(74) *Attorney, Agent, or Firm* — Kenealy Vaidya LLP

(57) ABSTRACT

A printing apparatus connectable to an external power supply having outputtable voltage information, including: a printing head performing printing by electric power supplied from the external power supply; a resistor having an electric resistivity based on the printing head; a detector detecting a substantial voltage; and a controller configured to: obtain the voltage information from the external power supply; decide a tentative voltage; request the external power supply to output the tentative voltage; energize the resistor with the tentative voltage; decide the substantial voltage if a voltage corresponding to each of the obtained voltage information is supplied based on a result of the detector during the energizing of the resistor; decide an electric power supply voltage based on the substantial voltage; and request the external power supply to output the electric power supply voltage.

22 Claims, 11 Drawing Sheets

FIG. 3A

EXTERNAL POWER SUPPLY 99a

| PROFILE NUMBER | POWER SUPPLY VOLTAGE | POWER SUPPLY ELECTRIC POWER |
|---|---|---|
| 1 | 20V | 100W |
| 2 | 20V | 60W |
| 3 | 15V | 45W |
| 4 | 12V | 36W |
| 5 | 9V | 27W |
| 6 | 5V | 15W |
| 7 | 5V | 2.5W |

FIG. 3B

EXTERNAL POWER SUPPLY 99b

| PROFILE NUMBER | POWER SUPPLY VOLTAGE | POWER SUPPLY ELECTRIC POWER |
|---|---|---|
| 1 | 12V | 36W |
| 2 | 9V | 27W |
| 3 | 5V | 15W |
| 4 | 5V | 2.5W |

| OPERATION MODE | PRINTING | CHARGING | NECESSARY VOLTAGE |
|---|---|---|---|
| FIRST MODE | HIGH-QUALITY PRINTING | QUICK CHARGING | 10V |
| SECOND MODE | ENERGY SAVING PRINTING | | 8V |
| THIRD MODE | PRINTING IS IMPOSSIBLE | | 6V |
| FOURTH MODE | | ENERGY SAVING CHARGING | - |

FIG. 5A

| POWER SUPPLY VOLTAGE | POWER SUPPLY ELECTRIC POWER | VOLTAGE DROP | SUBSTANTIAL VOLTAGE | OPERATION MODE |
|---|---|---|---|---|
| 20V | 100W | -5V | 15V (MEASURED VALUE) | FIRST MODE |
| 20V | 60W | -5V | 15V | FIRST MODE |
| 15V | 45W | -5V | 10V | FIRST MODE |
| 12V | 36W | -5V | 7V | THIRD MODE |
| 9V | 27W | -5V | 4V | FOURTH MODE |
| 5V | 15W | -5V | 0V | FOURTH MODE |
| 5V | 2.5W | -5V | 0V | FOURTH MODE |

FIG. 5B

| POWER SUPPLY VOLTAGE | POWER SUPPLY ELECTRIC POWER | VOLTAGE DROP | SUBSTANTIAL VOLTAGE | OPERATION MODE |
|---|---|---|---|---|
| 20V | 100W | -5V | 15V (MEASURED VALUE) | FIRST MODE |
| 20V | 60W | -5V | 15V | FIRST MODE |
| 15V | 45W | -3.75V | 11.25V | FIRST MODE |
| 12V | 36W | -3V | 9V | SECOND MODE |
| 9V | 27W | -2.25V | 6.75V | THIRD MODE |
| 5V | 15W | -1.25V | 3.75V | FOURTH MODE |
| 5V | 2.5W | -1.25V | 3.75V | FOURTH MODE |

FIG. 5C

| POWER SUPPLY VOLTAGE | POWER SUPPLY ELECTRIC POWER | VOLTAGE DROP | SUBSTANTIAL VOLTAGE | OPERATION MODE |
|---|---|---|---|---|
| 20V | 100W | -5V | 15V (MEASURED VALUE) | FIRST MODE |
| 20V | 60W | -5V | 15V (MEASURED VALUE) | FIRST MODE |
| 15V | 45W | -3.8V | 11.2V (MEASURED VALUE) | FIRST MODE |
| 12V | 36W | -3.2V | 8.8V (MEASURED VALUE) | SECOND MODE |
| 9V | 27W | -2.5V | 6.5V (MEASURED VALUE) | THIRD MODE |
| 5V | 15W | -2V | 3V (MEASURED VALUE) | FOURTH MODE |
| 5V | 2.5W | -2V | 3V (MEASURED VALUE) | FOURTH MODE |

FIG. 6A

| POWER SUPPLY VOLTAGE | POWER SUPPLY ELECTRIC POWER | VOLTAGE DROP | SUBSTANTIAL VOLTAGE | OPERATION MODE |
|---|---|---|---|---|
| 12V | 36W | -3.2V | 8.8V (MEASURED VALUE) | SECOND MODE |
| 9V | 27W | -3.2V | 5.8V | FOURTH MODE |
| 5V | 15W | -3.2V | 1.8V | FOURTH MODE |
| 5V | 2.5W | -3.2V | 1.8V | FOURTH MODE |

FIG. 6B

| POWER SUPPLY VOLTAGE | POWER SUPPLY ELECTRIC POWER | VOLTAGE DROP | SUBSTANTIAL VOLTAGE | OPERATION MODE |
|---|---|---|---|---|
| 12V | 36W | -3.2V | 8.8V (MEASURED VALUE) | SECOND MODE |
| 9V | 27W | -2.4V | 6.6V | THIRD MODE |
| 5V | 15W | -1.33V | 3.67V | FOURTH MODE |
| 5V | 2.5W | -1.33V | 3.67V | FOURTH MODE |

FIG. 6C

| POWER SUPPLY VOLTAGE | POWER SUPPLY ELECTRIC POWER | VOLTAGE DROP | SUBSTANTIAL VOLTAGE | OPERATION MODE |
|---|---|---|---|---|
| 12V | 36W | -3.2V | 8.8V (MEASURED VALUE) | SECOND MODE |
| 9V | 27W | -2.5V | 6.75V (MEASURED VALUE) | THIRD MODE |
| 5V | 15W | -2V | 3V (MEASURED VALUE) | FOURTH MODE |
| 5V | 2.5W | -2V | 3V (MEASURED VALUE) | FOURTH MODE |

PRINTING APPARATUS CONNECTED TO AN EXTERNAL POWER SUPPLY HAVING A PLURALITY OF VOLTAGE INFORMATION

CROSS-REFERENCE TO RELATED APPLICATIONS

This application is based on and claims priority under 35 USC 119 from Japanese Patent Application No. 2020-080244 filed on Apr. 30, 2020, the contents of which are incorporated herein by reference.

TECHNICAL FIELD

The present disclosure relates to a printing apparatus.

BACKGROUND

A related-art multi-function printer is electrically connected to an electric power supplying device via a cable. The multi-function printer includes a USB IF unit, a CPU, and the like. The USB IF unit is supplied with electric power from the electric power supplying device according to USB PD (USB Power Delivery), and supplies the electric power to each unit of the multi-function printer. The CPU performs negotiation with the electric power supplying device via the USB IF unit, and decides suppliable electric power. The CPU obtains a profile indicating the suppliable electric power from the electric power supplying device. The CPU executes a job (processing) relating to a function provided to the multi-function printer, based on the suppliable electric power indicated by the profile.

SUMMARY

One illustrative aspect of the present disclosure may provide a printing apparatus connectable to an external power supply, the external power supply having a plurality of voltage information and configured to output a voltage corresponding to any one of the plurality of voltage information, the printing apparatus including: a printing head configured to perform printing on a printing medium by electric power that is supplied from the external power supply; a resistor having an electric resistivity based on the printing head; a detector configured to detect a substantial voltage that is substantially supplied from the external power supply, a voltage output from the external power supply being lowered to the substantial voltage due to a voltage drop during the printing by the printing head in a case the resistor is energized with the electric power supplied from the external power supply; and a controller configured to: obtain the plurality of voltage information from the external power supply; decide, as a tentative voltage, a voltage corresponding to any one of the plurality of voltage information; request the external power supply to output the tentative voltage; energize the resistor with the tentative voltage that is supplied from the external power supply; decide the substantial voltage on a condition that a voltage corresponding to each of the voltage information obtained from the external power supply is supplied, based on a detection result of the detector during the energizing of the resistor; decide, as an electric power supply voltage, a voltage corresponding to any one of the plurality of voltage information, based on the substantial voltages; and request the external power supply to output the electric power supply voltage.

According to the above configuration, the printing apparatus decides the substantial voltage that is supplied from the external power supply during printing, and decides the electric power supply voltage that is output by the external power supply, based on the decided substantial voltage. Therefore, the printing apparatus can receive the appropriate electric power, in which a voltage drop during printing is considered, from the external power supply.

Another illustrative aspect of the present disclosure may provide a printing apparatus connectable to an external power supply, the external power supply having a plurality of voltage information and configured to output a voltage corresponding to any one of the plurality of voltage information, the printing apparatus including: a printing head configured to perform printing on a printing medium by electric power that is supplied from the external power supply; a detector configured to detect a substantial voltage that is substantially supplied from the external power supply, a voltage output from the external power supply being lowered to the substantial voltage due to a voltage drop during the printing by the printing head in a case the printing head is energized with the electric power supplied from the external power supply; and a controller configured to: obtain the plurality of voltage information from the external power supply; decide, as a tentative voltage, a voltage corresponding to any one of the plurality of voltage information; request the external power supply to output the tentative voltage; energize the printing head with the tentative voltage that is supplied from the external power supply; decide the substantial voltage on a condition that a voltage corresponding to each of the voltage information obtained from the external power supply is supplied, based on a detection result of the detector during the energizing of the printing head; decide, as an electric power supply voltage, a voltage corresponding to any one of the plurality of voltage information, based on the substantial voltages; and request the external power supply to output the electric power supply voltage.

According to the above configuration, the printing apparatus decides the substantial voltage that is supplied from the external power supply during printing, and decides the electric power supply voltage that is output by the external power supply, based on the decided substantial voltage. Therefore, the printing apparatus can receive the appropriate electric power, in which the voltage drop during printing is considered, from the external power supply.

BRIEF DESCRIPTION OF DRAWINGS

Illustrative aspects of the disclosure will be described in detail with reference to the following figures wherein:

FIGS. 3A and 3B each depicts an electric power profile of an external power supply;
FIG. 4 is a conceptual view of an operation mode table stored in a flash memory;
FIGS. 5A to 5C each depicts a relation among a power supply voltage, a substantial voltage, and an operation mode when a first external power supply is connected;
FIGS. 6A to 6C each depicts a relation among the power supply voltage, the substantial voltage, and the operation mode when a second external power supply is connected.

DETAILED DESCRIPTION

Figure 1:
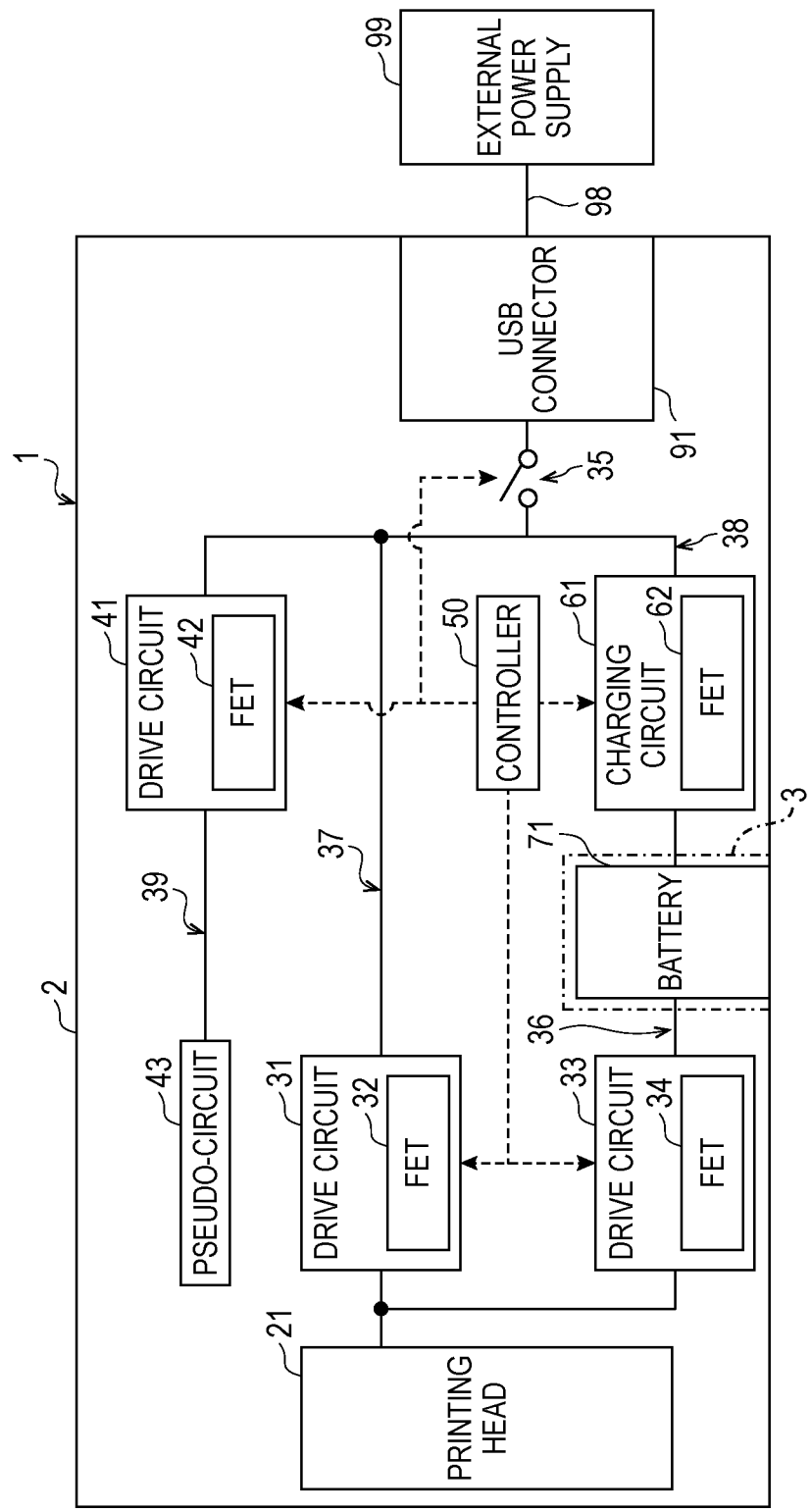
FIG. 1 depicts an electric system of a printing apparatus.

In the related-art multi-function printer, a large current may flow during printing, and a voltage drop may occur in some cases. In this case, a voltage that is supplied from a supply device to the multi-function printer is dropped, so that a print quality by the multi-function printer may be deteriorated. It is considered to decide the suppliable electric power so as to supply a high voltage so that the print quality is secured. However, there is an upper limit on the electric power that can be output at a time by an external power supply. When the external power supply is connected to the multi-function printer and a device other than the multi-function printer, a problem that the suppliable electric power that is supplied to the multi-function printer increases and thus the electric power that can be supplied to the device other than the multi-function printer decreases occurs.

Therefore, illustrative aspects of the present disclosure provide a printing apparatus capable of receiving appropriate electric power, in which a voltage drop during printing is considered, from an external power supply.

Hereinbelow, an illustrative embodiment of the present disclosure will be described with reference to the drawings. The accompanying drawings are used so as to describe technical features that can be adopted by the present disclosure. A configuration of an apparatus shown in the drawings is not intended to be limited thereto, and is merely an example of description.

A printing apparatus 1 is a thermal transfer-type printer configured to drive by electric power that is supplied from any one of an external power supply 99 and a battery 71. The printing apparatus 1 can print a character (an object such as a letter, a symbol, a number, a figure and the like) on a printing medium (for example, a heat sensitive label).

A configuration of the printing apparatus 1 is described with reference to FIG. 1. The printing apparatus 1 has a housing 2. A surface of the housing 2 is provided with an input interface 5 (refer to FIG. 2), a display 6 (refer to FIG. 2), and a USB (abbreviation of Universal Serial Bus) connector 91. The input interface 5 can receive a user's operation. The display 6 is a liquid crystal monitor configured to display a variety of information. The USB connector 91 is a connection port for connection to a USB device such as an external power supply 99 via a cable 98 conforming to Universal Serial Bus Power Delivery (USB PD) standards.

The external power supply 99 is, for example, a general purpose personal computer, a mobile terminal, a tablet terminal or the like. The external power supply 99 has a plurality of electric power profiles (refer to FIGS. 3A to 3C) based on power rules in the USB PD standards. Each electric power profile indicates a combination of a predetermined electric power (hereinbelow, referred to as power supply electric power) and a voltage (hereinbelow, referred to as power supply voltage) that can be output by the external power supply 99. The external power supply 99 can output a power supply electric power (power supply voltage), which is indicated by any one of the plurality of electric power profiles, to the printing apparatus 1. The USB connector 91 is configured to relay the electric power that is supplied from the external power supply 99.

In a housing 2, a controller 50, a mounting part 3, a printing head 21, a pseudo-circuit 43, a first line 36, a second line 37, a third line 38, a fourth line 39, drive circuits 31, 33 and 41, a charging circuit 61, and the like are provided. The controller 50 is configured to collectively control the printing apparatus 1. The battery 71 can be detachably mounted to the mounting part 3. The battery 71 is, for example, a lithium ion battery or an electric double layer capacitor.

The printing head 21 can generate heat as it is driven, thereby performing printing on a printing medium. The printing head 21 can generate heat with electric power supplied thereto, thereby performing printing on the printing medium. The pseudo-circuit 43 is a resistor having an electric resistivity based on the printing head 21. The "electric resistivity based on the printing head 21" refers to an electric resistivity that is 0.5 to 1.5 times as large as an electric resistivity of the printing head 21. In the present embodiment, the electric resistivity of the pseudo-circuit 43 and the electric resistivity of the printing head 21 have the same value.

The first line 36 is connected to the battery 71 mounted to the mounting part 3 and to the printing head 21. The first line 36 transmits electric power discharged from the battery 71 to the printing head 21. The first line 36 is provided with the drive circuit 33. The drive circuit 33 is an electronic circuit for controlling drive of the printing head 21. The drive circuit 33 has a FET (abbreviation of Field Effect Transistor) 34 that is a switching element. The FET 34 is switched to an ON state and an OFF state, in response to an instruction output from the controller 50. When the FET 34 is in the ON state, the first line 36 transmits electric power from the battery 71 to the printing head 21. When the FET 34 is in the OFF state, the first line 36 stops transmission of electric power from the battery 71 to the printing head 21.

The third line 38 is connected to the battery 71 mounted to the mounting part 3 and to the USB connector 91. The third line 38 transmits power supply electric power, which is relayed by the USB connector 91, to the battery 71 mounted to the mounting part 3. The third line 38 is provided with the charging circuit 61. The charging circuit 61 is an electronic circuit for controlling charging to the battery 71. The charging circuit 61 has a FET 62 that is a switching element. The FET 62 is switched to an ON state and an OFF state, in response to an instruction output from the controller 50. When the FET 62 is in the ON state, the third line 38 transmits electric power from the USB connector 91 to the battery 71. When the FET 62 is in the OFF state, the third line 38 stops transmission of electric power from the USB connector 91 to the battery 71.

The second line 37 is directly connected to the printing head 21 and the USB connector 91. The second line 37 transmits power supply electric power, which is relayed by the USB connector 91, to the printing head 21. The second line 37 is provided with the drive circuit 31. Similar to the drive circuit 33, the drive circuit 31 is an electronic circuit for controlling drive of the printing head 21. The drive circuit 31 has a FET 32 that is a switching element. The FET 32 is switched to an ON state and an OFF state, in response to an instruction output from the controller 50. When the FET 32 is in the ON state, the second line 37 transmits electric power from the USB connector 91 to the printing head 21. When the FET 32 is in the OFF state, the second line 37 stops transmission of electric power from the USB connector 91 to the printing head 21.

The fourth line 39 is directly connected to the pseudo-circuit 43 and the USB connector 91. The fourth line 39 transmits the power supply electric power, which is relayed by the USB connector 91, to the pseudo-circuit 43. The fourth line 39 is provided with the drive circuit 41. The drive circuit 41 is an electronic circuit for controlling the power supply electric power that is transmitted by the fourth line 39. The drive circuit 41 has a FET 42 that is a switching element. The FET 42 is switched to an ON state and an OFF state, in response to an instruction output from the controller 50. When the FET 42 is in the ON state, the fourth line 39 transmits electric power from the USB connector 91 to the pseudo-circuit 43. When the FET 42 is in the OFF state, the fourth line 39 stops transmission of the electric power from the USB connector 91 to the pseudo-circuit 43.

The second line 37, the third line 38, and the fourth line 39 are provided with a switch 35. The switch 35 is switched to an ON state and an OFF state, in response to an instruction output from the controller 50. When the switch 35 is in the ON state, the power supply electric power that is relayed by the USB connector 91 is transmitted to the drive circuits 31 and 41 and the charging circuit 61. When the switch 35 is in the OFF state, transmission of the power supply electric power, which is relayed by the USB connector 91, to the drive circuits 31 and 41 and the charging circuit 61 is stopped.

Figure 2:
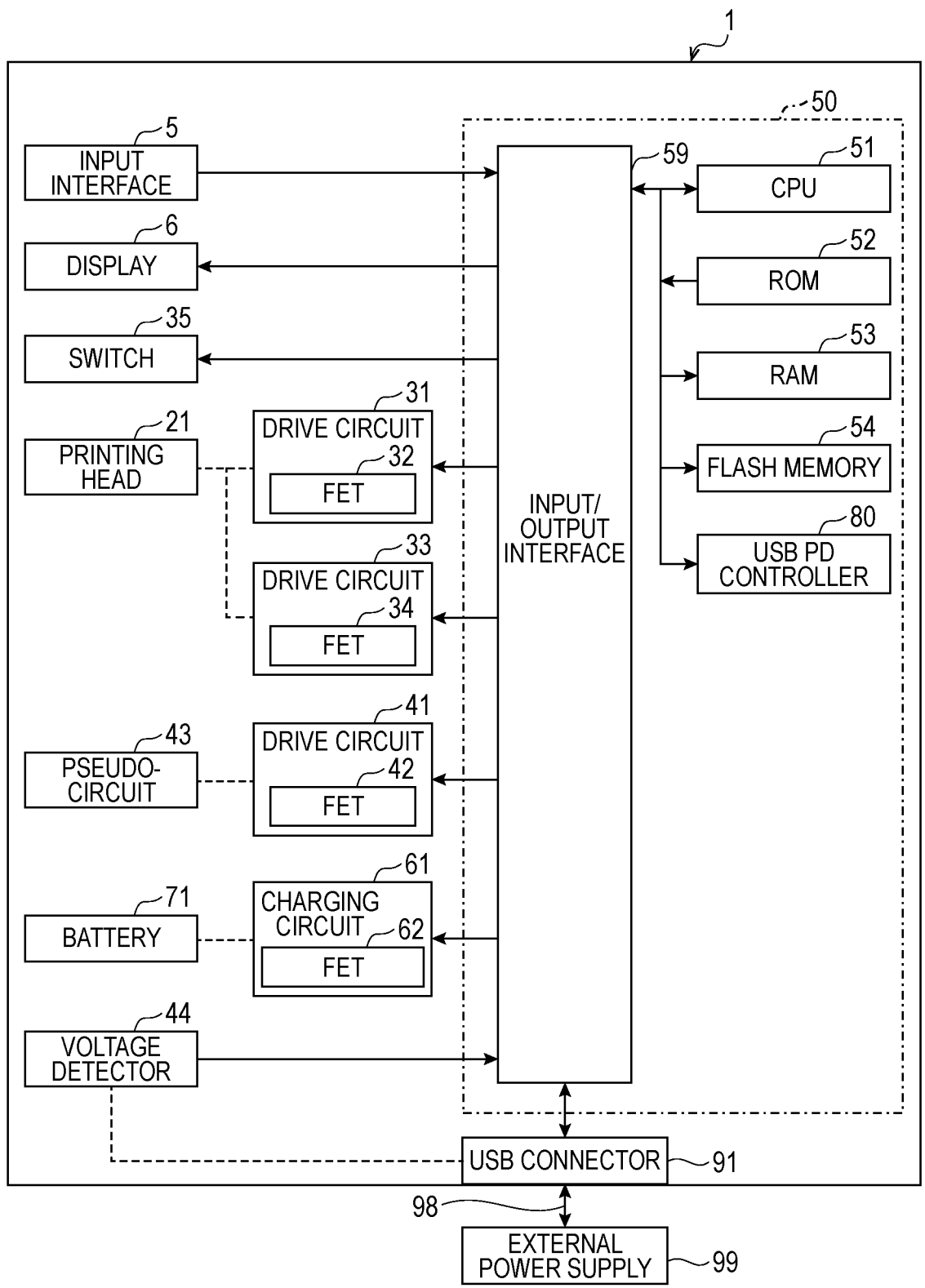
FIG. 2 is a block diagram depicting an electrical configuration of the printing apparatus.

An electrical configuration of the printing apparatus 1 is described with reference to FIG. 2. The controller 50 includes a CPU (abbreviation of Central Processing Unit) 51, a ROM (abbreviation of Read Only Memory) 52, a RAM (abbreviation of Random Access Memory) 53, a flash memory 54, a USB PD controller 80, and an input/output interface (hereinbelow, referred to as the input/output I/F) 59. The ROM 52, the RAM 53, the flash memory 54, the USB PD controller 80, and the input/output I/F (abbreviation of interface) 59 are each electrically connected to the CPU 51.

The CPU 51 is configured to execute a variety of programs for controlling the printing apparatus 1. In the ROM 52, a variety of programs, and the like are stored. In the RAM 53, a flag, a counter, a calculation result, and the like are temporarily stored. In the flash memory 54, a variety of settings, an operation mode table 92, and the like of the printing apparatus 1 are stored. The USB PD controller 80 is configured to control the switch 35 and to perform communication with the external power supply 99, in response to instructions output from the CPU 51.

The CPU 51 is electrically connected to the input interface 5, the display 6, the drive circuits 31, 33 and 41, the charging circuit 61, a voltage detector 44 and the USB connector 91 via the input/output I/F 59. The input interface 5 is configured to input a receiving result of a user's operation to the CPU 51. The display 6 is configured to display a variety of information, in response to an instruction output from the CPU 51. The voltage detector 44 is configured to detect a voltage that is relayed by the USB connector 91.

The CPU 51 is configured to control the charging circuit 61, thereby controlling charging to the battery 71. The printing apparatus 1 does not perform charging to the battery 71 and printing by the printing head 21 at the same time. When charging the battery 71, the CPU 51 switches the FET 62 to the ON state and the FETs 32 and 34 to the OFF state.

The CPU 51 is configured to control the drive circuits 31, 33 and 41, thereby controlling transmission of electric power by the first line 36, the second line 37, and the fourth line 39. When connected to the external power supply 99, the printing apparatus 1 performs printing by the electric power that is supplied from the external power supply 99, and when not connected to the external power supply 99, the printing apparatus 1 performs printing by the electric power that is supplied from the battery 71.

The external power supply 99 is electrically connected to the USB PD controller 80 via the USB connector 91 and the input/output I/F 59. The CPU 51 is configured to perform communication with the external power supply 99 via the USB PD controller 80. The CPU 51 is configured to obtain the plurality of electric power profiles of the external power supply 99.

The electric power profiles of the external power supply 99 are described with reference to FIG. 3. In the present embodiment, the external power supply 99 is external power supplies 99a and 99b having different electric power profiles. The external power supply 99a (one example of a first external power supply) has seven electric power profiles, in each of which a profile number, a power supply voltage, and a power supply electric power are associated. The external power supply 99b (one example of a second external power supply) has four electric power profiles, in each of which a profile number, a power supply voltage, and a power supply electric power are associated, similar to the external power supply 99a. The electric power profiles of the profile Nos. 1 to 4 of the external power supply 99b are the same as the electric power profiles of the profile Nos. 4 to 7 of the external power supply 99a, in terms of the power supply voltage and the power supply electric power.

The CPU 51 is configured to decide any one of the plurality of electric power profiles, and to request the external power supply 99 to output power supply electric power indicated by the decided electric power profile. When performing printing by receiving the requested power supply electric power, a large amount of electric power is consumed and a voltage drop occurs in the printing head 21 that generates heat. In this case, a voltage (hereinbelow, referred to as a substantial voltage) that is substantially supplied from the external power supply 99 to the printing apparatus 1 via the USB connector 91 becomes lower than the power supply voltage due to the voltage drop. Therefore, operations (printing, charging and the like) that are to be executed by the printing apparatus 1 may be restricted.

The operation mode table 92 that is stored in the flash memory 54 is described with reference to FIG. 4. In the operation mode table 92, a first mode to a fourth mode that are operation modes are stored. The operation mode is a combination of operations relating to printing and charging. The printing apparatus 1 is configured to decide one operation mode from the operation mode table 92, and to perform printing on the printing medium and charging of the battery 71, based on the decided operation mode. In the operation mode table 92, an operation mode and a necessary voltage, which is a voltage necessary for the printing apparatus 1 to operate in the operation mode, are associated.

In the first mode, a high-quality printing and a quick charging are executed. The high-quality printing is an operation relating to printing. When the printing apparatus 1 performs printing on the printing medium with the high-quality printing, a high-quality printed medium is prepared. The quick charging is an operation relating to charging. When the printing apparatus 1 charges the battery 71 with the quick charging, the battery 71 is charged in a short time. In the first mode, the necessary voltage is 10V. In the second mode, an energy saving printing and the quick charging are executed. The energy saving printing is an operation relating to printing. When the printing apparatus 1 performs printing on the printing medium with the energy saving printing, a printed medium of a lower quality is prepared, as compared to the printing with the high-quality printing. In the second mode, the necessary voltage is 8V.

In the third mode, the quick charging is executed, but the printing is not executed (the printing is impossible). In the third mode, the necessary voltage is 6V. In the fourth mode, an energy saving charging is executed and the printing is not executed. The energy saving charging is an operation relating to charging. In the energy saving charging, the electric power for charging the battery 71 is 2.5 W (5V/500 mA) based on USB BC (Battery Charging) standards. When the printing apparatus 1 charges the battery 71 with the energy saving charging, a time for the charging of the battery 71 is prolonged, as compared to the charging with the quick charging. In the fourth mode, there is no necessary voltage.

A flow where the printing apparatus 1 decides the power supply electric power that is output by the external power supply 99 is described with reference to FIGS. 5A to 6C. When deciding the power supply electric power, the CPU 51 decides the substantial voltage when the power supply electric power indicated by each electric power profile of the external power supply 99 is energized, by energizing the pseudo-circuit 43 in advance with the power supply electric power.

Three methods of deciding the substantial voltage in each electric power profile are exemplified. In a first method, the CPU 51 obtains the plurality of electric power profiles via the USB PD controller 80, and tentatively decides any one of the plurality of electric power profiles. At this time, the CPU 51 tentatively decides an electric power profile having the highest power supply electric power among the electric power profiles having the highest power supply voltage. The CPU 51 requests the external power supply 99 to output power supply electric power indicated by the tentatively decided electric power profile (hereinbelow, referred to as tentative electric power profile).

The CPU 51 energizes the pseudo-circuit 43 with the power supply electric power that is output by the external power supply 99. The CPU 51 obtains, from the voltage detector 44, a magnitude of the substantial voltage lowered due to the voltage drop. The CPU 51 decides a voltage drop in the tentative electric power profile, based on the power supply voltage indicated by the tentative electric power profile and the obtained substantial voltage (hereinbelow, referred to as a measured substantial voltage).

The CPU 51 assumes that magnitudes of the voltage drops in the electric power profiles except the tentative electric power profile are the same as the voltage drop in the tentative electric power profile. The CPU 51 calculates and decides the substantial voltages in each of the electric power profiles, based on the power supply voltage indicated by each of the electric power profiles and the voltage drop in the tentative electric power profile.

As shown in FIG. 5A, in the first method, the CPU 51 obtains the magnitude of the measured substantial voltage from the voltage detector 44, and decides the voltage drop. The CPU 51 decides the voltage drop of −5V from the power supply voltage of 20V of the tentative electric power profile and the obtained measured substantial voltage of 15V. The CPU 51 also decides the voltage drop of −5V in each of the electric power profiles except the tentative electric power profile. The CPU 51 calculates and decides the substantial voltages in the electric power profiles except the tentative electric power profile, based on the power supply voltage and the voltage drop of −5V.

In a second method, the CPU 51 tentatively decides any one of the plurality of obtained electric power profiles. Similar to the first method, the CPU 51 decides an electric power profile having the highest power supply electric power among the electric power profiles having the highest power supply voltage, as a tentative electric power profile. The CPU 51 receives power supply electric power indicated by the tentative electric power profile from the external power supply 99, and energizes the pseudo-circuit 43 with the received power supply electric power. The CPU 51 obtains a measured substantial voltage from the voltage detector 44, and decides a voltage drop in the tentative electric power profile.

The CPU 51 assumes that a magnitude of the voltage drop is proportional to a voltage, and decides voltage drops in the electric power profiles except the tentative electric power profile, based on ratios of the power supply voltage of the tentative electric power profile and the power supply voltages of the electric power profiles except the tentative electric power profile and the voltage drop in the tentative electric power profile. The CPU 51 calculates and decides the substantial voltages in each of the electric power profiles, based on the power supply voltages indicated by each of the electric power profiles and the voltage drops in each of the electric power profiles decided by the ratios.

As shown in FIG. 5B, in the second method, the CPU 51 decides the voltage drops (for example, −3V) in the electric power profiles except the tentative electric power profile, based on the ratios of the power supply voltage of 20V of the tentative electric power profile and the power supply voltages (for example, 12V) of the electric power profiles except the tentative electric power profile and the voltage drop (−5V) in the tentative electric power profile. The CPU 51 calculates and decides the substantial voltages in the electric power profiles except the tentative electric power profile, based on the power supply voltages and the decided voltage drops.

In a third method, the CPU 51 decides sequentially one by one the plurality of electric power profiles of the external power supply 99, as the tentative electric power profile. The pseudo-circuit 43 is energized with the power supply electric power indicated by the tentative electric power profile, and the measured substantial voltage is obtained from the voltage detector 44. For all the electric power profiles, the CPU 51 energizes the pseudo-circuit 43 with the power supply electric power, and confirms and decides the measured substantial voltage (refer to FIG. 5C).

For each of the electric power profiles, the CPU 51 derives each operation mode that is executed when the power supply electric power is received, based on the substantial voltage decided in the first method to the third method and the necessary voltages that are stored in the operation mode table 92. The CPU 51 sets an operation mode, in which the necessary voltage is highest, of the operation modes in which the substantial voltage is higher than the necessary voltage and which can operate, as the operation mode that is executed in each electric power profile.

The printing apparatus 1 can mutually switch an automatic setting in which the operation mode to be executed is automatically selected by the CPU 51 and a manual setting in which the operation mode to be executed is manually selected by a user. In a case of the automatic setting, the CPU 51 refers to the operation mode in each electric power profile, and selects the operation mode, in which the necessary voltage is highest, of the executable operation modes. In a case of the manual setting, the user operates the input interface 5 before connecting the external power supply 99 to the printing apparatus 1. The CPU 51 that receives an operation result by the user from the input interface 5 sets an operation mode corresponding to the operation result.

The CPU 51 decides power supply electric power that is output by the external power supply 99. In a case of the automatic setting, the CPU 51 decides power supply electric power indicated by the electric power profile having the lowest power supply voltage among the electric power profiles capable of executing the selected operation mode. In a case of the manual setting, the CPU 51 checks whether there is an electric power profile in which the substantial voltage is equal to or higher than the necessary voltage of the selected operation mode. The CPU 51 decides power supply electric power indicated by the electric power profile having the lowest power supply voltage among the electric power profiles in which the substantial voltage is equal to or higher than the necessary voltage of the selected operation mode.

Main processing of the first embodiment is described with reference to FIGS. 7 to 11. The main processing is processing for deciding the power supply electric power that is output by the external power supply 99. In the main processing of the first embodiment, the substantial voltage is decided by any one of the first method and the second method. Upon start of the main processing, the FETs 32, 34, 42 and 62 and the switch 35 are all in the OFF state. When the printing apparatus 1 is turned on, the CPU 51 reads out a program stored in the ROM 52, and executes the main processing.

Figure 7:
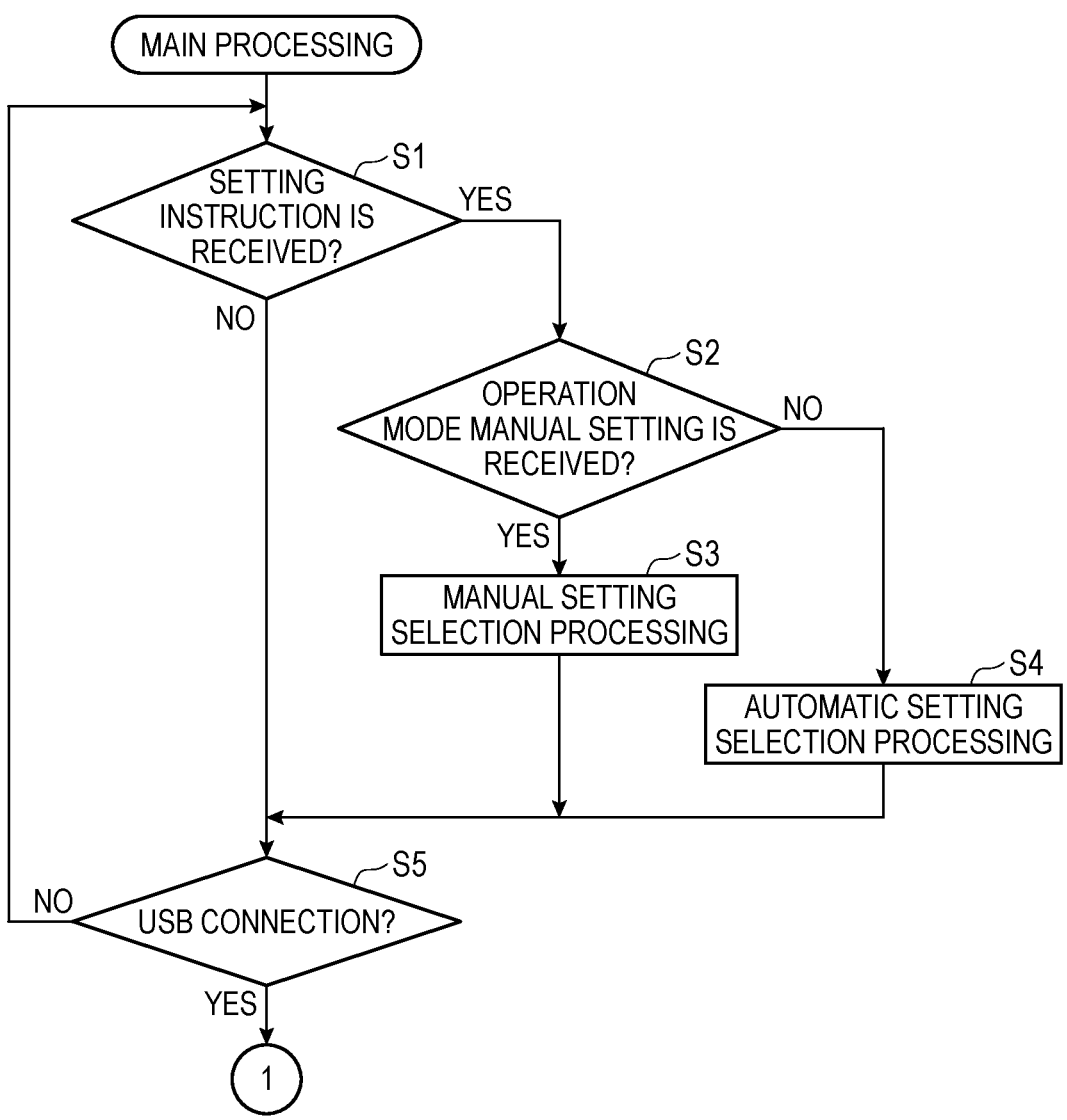
FIG. 7 is a flowchart of main processing of a first embodiment.

As shown in FIG. 7, when the main processing starts, the CPU 51 determines whether a setting instruction is received (51). When performing a setting relating to the operation mode, the user operates the input interface 5. The input interface 5 outputs a setting instruction to the CPU 51. When it is determined that the setting instruction is not received (51: NO), the CPU 51 shifts the processing to S5.

When it is determined that the setting instruction is received (51: YES), the CPU 51 determines whether an operation mode setting instruction is received (S2). When the user makes a setting of manually selecting the operation mode, the user operates the input interface 5. When it is determined that the setting instruction is received (S2: YES), the CPU 51 executes manual setting selection processing (S3), and shifts the processing to S5. In the manual setting selection processing, the CPU 51 receives an operation result by the user on the input interface 5 with the manual setting, and sets an operation mode that is to be executed by the printing apparatus 1 according to the operation result. When it is determined that the setting instruction is not received (S2: NO), the CPU 51 executes automatic setting selection processing (S4), and shifts the processing to S5. In the automatic setting selection processing, the CPU 51 automatically sets the operation mode in a case where the external power supply 99 is connected.

The CPU 51 determines whether the external power supply 99 is connected to the USB connector 91 via the cable 98 (S5). When it is determined that the external power supply 99 is not connected to the USB connector 91 (S5: NO), the CPU 51 returns the processing to S1. The CPU 51 repeats the processing of S1 to S5 until the external power supply 99 is connected to the USB connector 91. When it is determined that the external power supply 99 is connected to the USB connector 91 (S5: YES), the CPU 51 shifts the processing to S11 (refer to FIG. 8).

Figure 8:
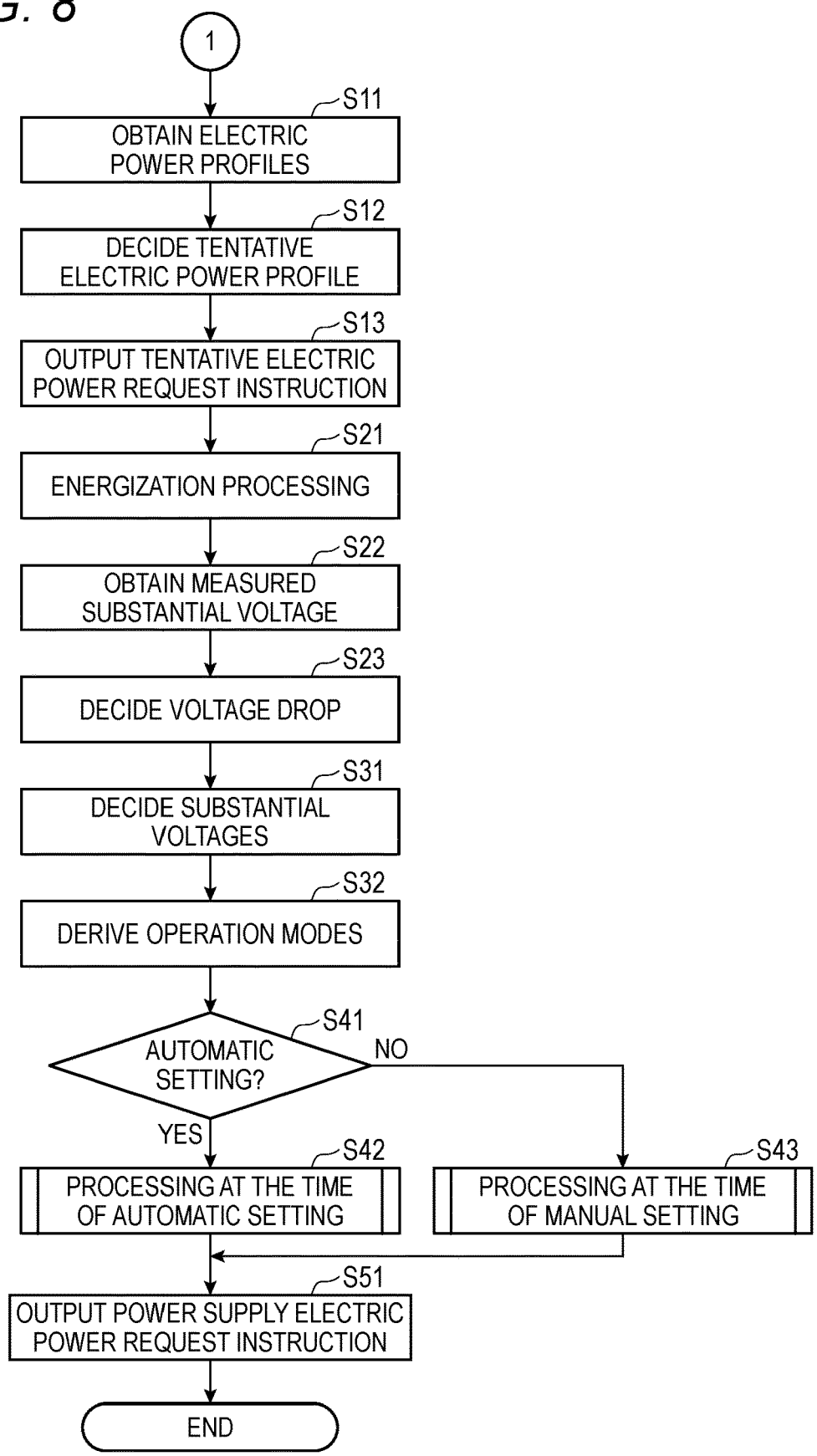
FIG. 8 is a flowchart of the main processing continuing to FIG. 7.

As shown in FIG. 8, the CPU 51 obtains the plurality of electric power profiles from the external power supply 99 via the USB PD controller 80 (S11). The CPU 51 decides, as the tentative electric power profile, an electric power profile in which the power supply voltage and the power supply electric power are highest from the obtained electric power profiles (S12). The CPU 51 outputs a tentative electric power request instruction to the external power supply 99 so as to output a power supply electric power indicated by the decided tentative electric power profile (S13). The external power supply 99 that receives the tentative electric power request instruction from the printing apparatus 1 outputs the power supply electric power indicated by the tentative electric power profile.

The CPU 51 executes energization processing (S21). In the energization processing, the CPU 51 sets the switch 35 and the FET 42 to the ON state to energize the pseudo-circuit 43 with the received power supply electric power. The CPU 51 obtains a measured substantial voltage from the voltage detector 44 (S22).

The CPU 51 decides a voltage drop from the obtained measured substantial voltage (S23). In S23, when deciding the substantial voltage by the first method, the CPU 51 calculates a voltage drop in the tentative electric power profile from the power supply voltage of the tentative electric power profile and the measured substantial voltage. The CPU 51 assumes that voltage drops in the electric power profiles except the tentative electric power profile are the same as the voltage drop in the tentative electric power profile. When deciding the substantial voltage by the second method, the CPU 51 calculates a voltage drop in the tentative electric power profile from the power supply voltage of the tentative electric power profile and the measured substantial voltage. The CPU 51 decides voltage drops in the electric power profiles except the tentative electric power profile, based on the ratios of the power supply voltage of the tentative electric power profile and the power supply voltages of the electric power profiles except the tentative electric power profile and the voltage drop in the tentative electric power profile.

The CPU 51 decides substantial voltages (S31). In S31, the CPU 51 decides the substantial voltages in each of the electric power profiles from the power supply voltage and the voltage drop of the tentative electric power profile. The CPU 51 derives operation modes that are to be executed in each of the electric power profiles (S32). In S32, the CPU 51 sets an operation mode having the highest necessary voltage among the operable operation modes, as the operation modes that are to be executed in each of the electric power profiles.

The CPU 51 determines whether the CPU 51 automatically sets the operation mode (S41). When the automatic setting is selected in S4 (S41: YES), the CPU 51 executes processing at the time of the automatic setting (S42), and shifts the processing to S51. When the manual setting is selected in S3 (S41: NO), the CPU 51 executes processing at the time of the manual setting (S43), and shifts the processing to S51.

Figure 9:
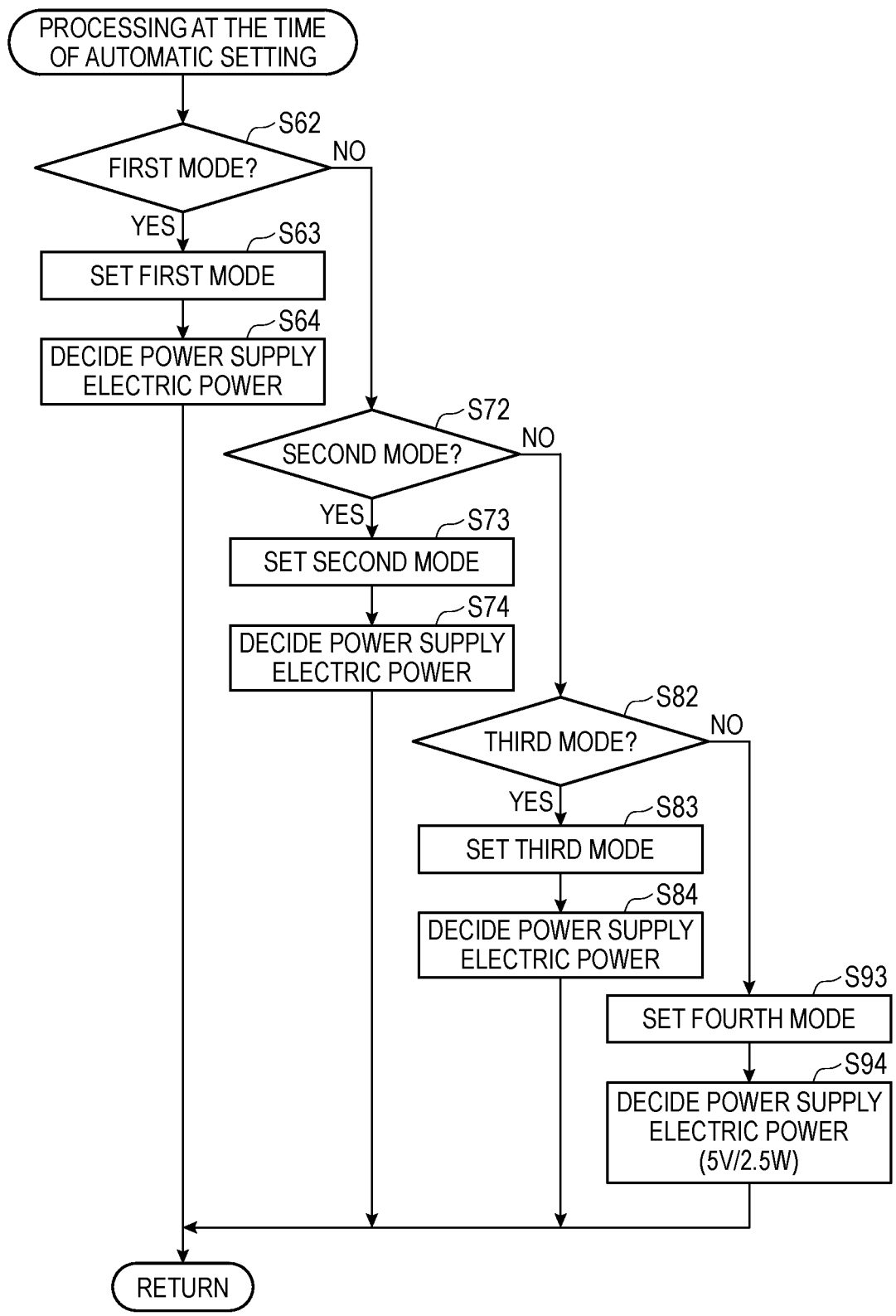
FIG. 9 is a flowchart of processing at the time of automatic setting.

The processing at the time of the automatic setting (S42, refer to FIG. 8) is described with reference to FIG. 9. The processing at the time of the automatic setting is processing for automatically selecting an operation mode and deciding a power supply electric power. When the processing at the time of the automatic setting starts, the CPU 51 determines whether the first mode is included in the operation modes derived in S32 (refer to FIG. 8), which are to be executed in each of the electric power profiles (S62). When it is determined that the first mode is included in the operation modes that are to be executed in each of the electric power profiles (S62: YES), the CPU 51 sets the first mode, as the operation mode that is to be executed by the printing apparatus 1 (S63). The CPU 51 decides, as the power supply electric power that is output by the external power supply 99, the power supply electric power indicated by the electric power profile having the lowest power supply voltage among the electric power profiles capable of executing the first mode (S64), and returns the processing to the main processing (refer to FIG. 8).

When it is determined that the first mode is not included in the operation modes that are to be executed in each of the electric power profiles (S62: NO), the CPU 51 determines whether the second mode is included in the operation modes derived in S32, which are to be executed in each of the electric power profiles (S72). When it is determined that the second mode is included in the operation modes that are to be executed in each of the electric power profiles (S72: YES), the CPU 51 sets the second mode, as the operation mode that is to be executed by the printing apparatus 1 (S73). The CPU 51 decides, as the power supply electric power that is output by the external power supply 99, the power supply electric power indicated by the electric power profile having the lowest power supply voltage among the electric power profiles capable of executing the second mode (S74), and returns the processing to the main processing.

When it is determined that the second mode is not included in the operation modes that are to be executed in each of the electric power profiles (S72: NO), the CPU 51 determines whether the third mode is included in the operation modes derived in S32, which are to be executed in each of the electric power profiles (S82). When it is determined that the third mode is included in the operation modes that are to be executed in each of the electric power profiles (S82: YES), the CPU 51 sets the third mode, as the operation mode that is to be executed by the printing apparatus 1 (S83). The CPU 51 decides, as the power supply electric power that is output by the external power supply 99, the power supply electric power indicated by the electric power profile having the lowest power supply voltage among the electric power profiles capable of executing the third mode (S84), and returns the processing to the main processing.

When it is determined that the third mode is not included in the operation modes that are to be executed in each of the electric power profiles (S72: NO), the CPU 51 assumes that there is only the fourth mode as the operation mode to be executed, and sets the fourth mode, as the operation mode that is to be executed by the printing apparatus 1 (S93). The CPU 51 decides 2.5 W (5V/500 mA) as the power supply electric power that is output by the external power supply 99 (S94), and returns the processing to the main processing.

The processing at the time of the manual setting (S43, refer to FIG. 8) is described with reference to FIG. 10. The processing at the time of the manual setting is processing for deciding a power supply electric power, based on an operation mode set according to an operation result by the user on the input interface 5. When the processing at the time of the manual setting stars, the CPU 51 determines whether the operation mode set in S3 is the first mode (S101). When it is determined that the set operation mode is the first mode (S101: YES), the CPU 51 determines whether there is an electric power profile whose substantial voltage is equal to or higher than the necessary voltage (10V) of the first mode (S102).

When it is determined that there is an electric power profile whose substantial voltage is equal to or higher than the necessary voltage of the first mode (S102: YES), the CPU 51 decides, as the power supply electric power that is output by the external power supply 99, a power supply electric power indicated by the electric power profile having the lowest power supply voltage among the electric power profiles whose substantial voltages are equal to or higher than the necessary voltage of the first mode (S104), and returns the processing to the main processing. When it is determined that there is no electric power profile whose substantial voltage is equal to or higher than the necessary voltage of the first mode (S102: NO), the CPU 51 proceeds to S131 (refer to FIG. 11).

When it is determined that the set operation mode is not the first mode (S101: NO), the CPU 51 determines whether the operation mode set in S3 is the second mode (S111). When it is determined that the set operation mode is the second mode (S111: YES), the CPU 51 determines whether there is an electric power profile whose substantial voltage is equal to or higher than the necessary voltage (8V) of the second mode (S112).

When it is determined that there is an electric power profile whose substantial voltage is equal to or higher than the necessary voltage of the second mode (S112: YES), the CPU 51 decides, as the power supply electric power that is output by the external power supply 99, a power supply electric power of the electric power profile having the lowest power supply voltage among the electric power profiles whose substantial voltages are equal to or higher than the necessary voltage of the second mode (S114), and returns the processing to the main processing. When is determined that there is no electric power profile whose substantial voltage is equal to or higher than the necessary voltage of the second mode (S112: NO), the CPU 51 proceeds to S131.

Figure 11:
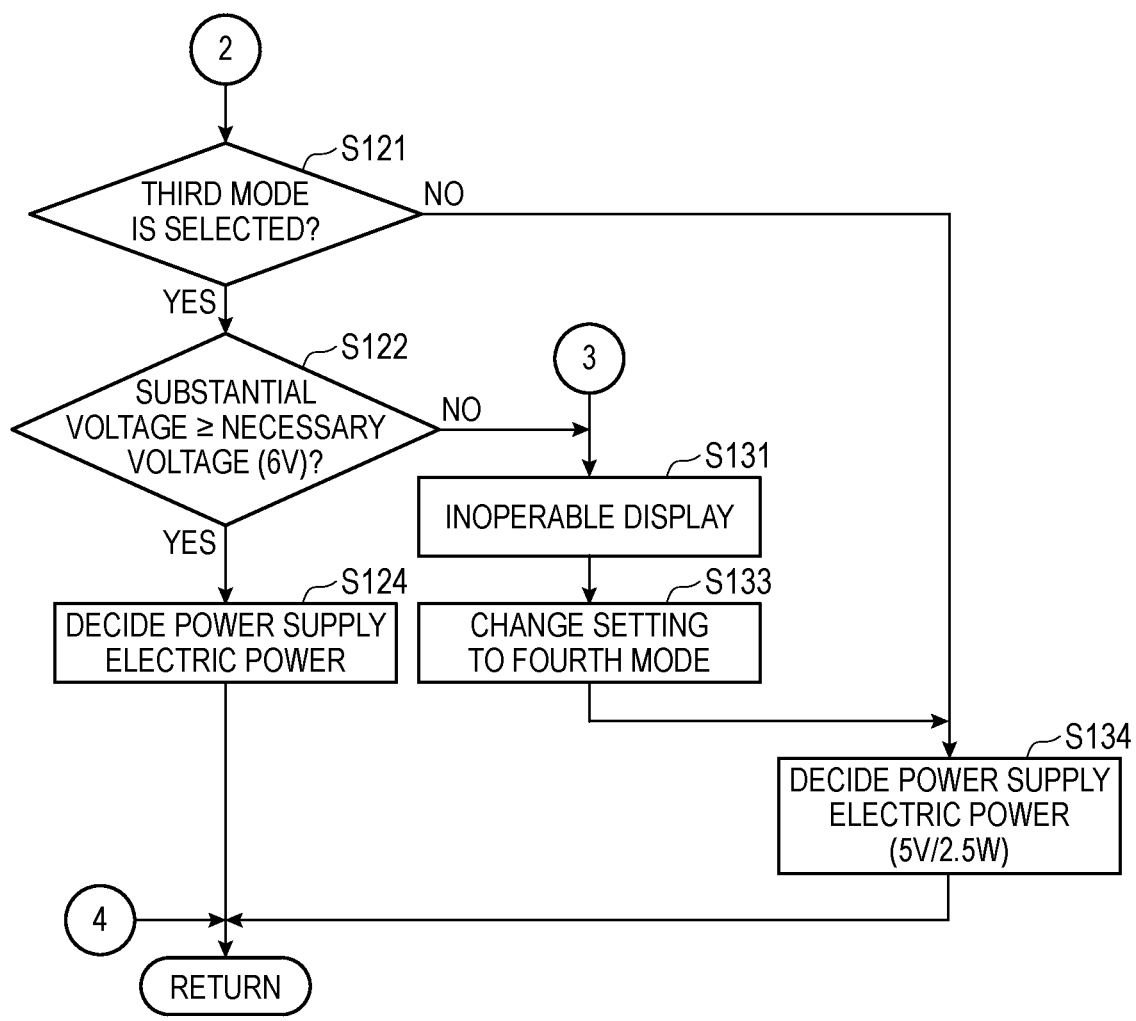
FIG. 11 is a flowchart of the processing at the time of the manual setting continuing to FIG. 10.

When it is determined that the set operation mode is not the second mode (S111: NO), the CPU 51 determines whether the operation mode set in S3 is the third mode (S121), as shown in FIG. 11. When it is determined that the set operation mode is not the third mode (S121: NO), the CPU 51 assumes that the set operation mode is the fourth mode, decides 2.5 W (5V/500 mA) as the power supply electric power that is output by the external power supply 99 (S134), and returns the processing to the main processing.

When it is determined that the set operation mode is the third mode (S121: YES), the CPU 51 determines whether there is an electric power profile whose substantial voltage is equal to or higher than the necessary voltage (6V) of the third mode (S122). When it is determined that there is an electric power profile whose substantial voltage is equal to or higher than the necessary voltage of the third mode (S122: YES), the CPU 51 decides, as the power supply electric power that is output by the external power supply 99, a power supply electric power indicated by the electric power profile having the lowest power supply voltage among the electric power profiles whose substantial voltages are equal to or higher than the necessary voltage of the third mode (S124), and returns the processing to the main processing.

When it is determined that there is no electric power profile whose substantial voltage is equal to or higher than the necessary voltage of the third mode (S122: NO), the CPU 51 assumes that the operation mode set according to the operation result by the user on the input interface 5 cannot be executed, and displays an inoperable display on the display 6 (S131). The CPU 51 changes the operation mode set in S3 to the fourth mode (S133). The CPU 51 shifts the processing to S134.

Figure 10:
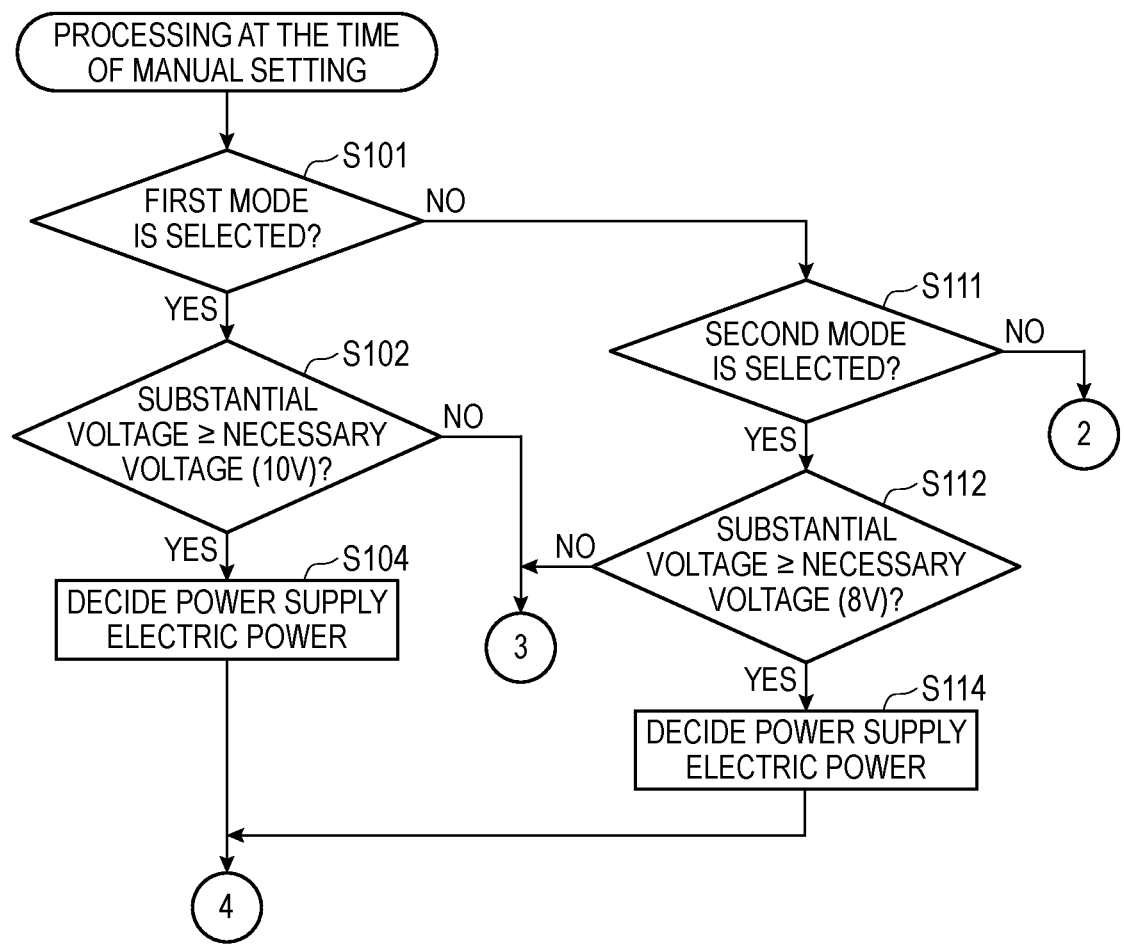
FIG. 10 is a flowchart of processing at the time of manual setting.

Returning to descriptions of FIG. 10, after executing the processing at the time of the automatic setting (S42) or the processing at the time of the manual setting (S43), the CPU 51 proceeds to S51. In S51, the CPU 51 outputs a power supply electric power request instruction to the external power supply 99 so as to output the power supply electric power decided in the processing at the time of the automatic setting (S42) or the processing at the time of the manual setting (S43). The external power supply 99 that receives the power supply electric power request instruction from the printing apparatus 1 outputs the power supply electric power decided in the processing at the time of the automatic setting (S42) or the processing at the time of the manual setting (S43). The printing apparatus 1 that receives the power supply electric power from the external power supply 99 executes an operation with the decided operation mode.

Figure 12:
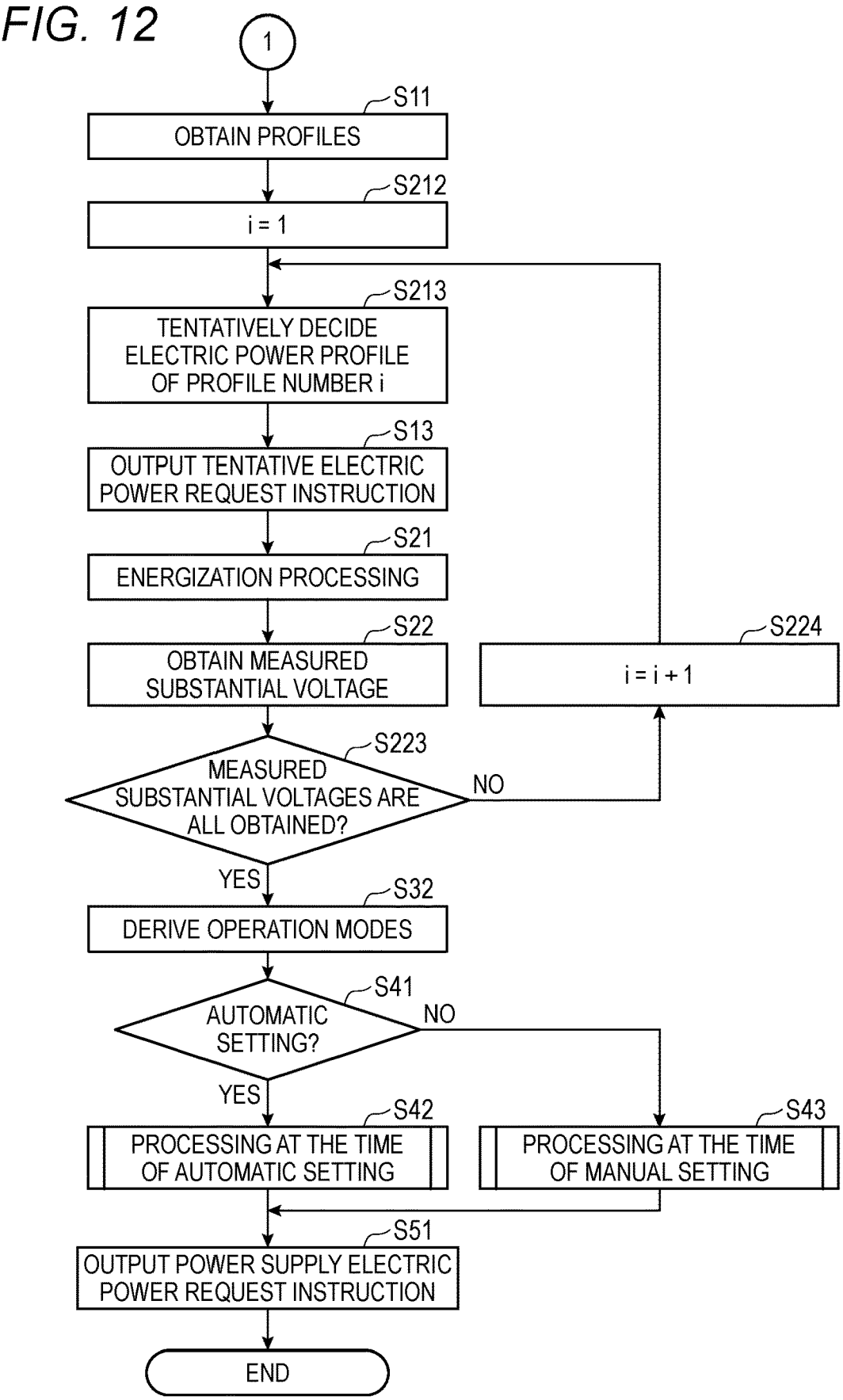
FIG. 12 is a modified embodiment of a flowchart of main processing of a second embodiment.

Main processing of a second embodiment is described with reference to FIG. 12. In the main processing of the second embodiment, the substantial voltage is decided by the third method. The main processing of the second embodiment is different from the main processing of the first embodiment, in that processing of S212 to S224 is executed instead of the processing of S12 to S31 (refer to FIG. 8). Hereinbelow, the descriptions of the similar processing to the main processing of the first embodiment are omitted, and processing different from the main processing of the first embodiment is described.

After obtaining the electric power profiles from the external power supply 99 in S11, the CPU 51 sets a value of a variable i to 1 (S212). The CPU 51 decides, as the tentative electric power profile, an electric power profile whose profile number is the same value as the variable i (S213). The CPU 51 outputs a tentative electric power request instruction to the external power supply 99 (S13). The CPU 51 executes the energization processing (S21), and obtains the measured substantial voltage from the voltage detector 44 (S22).

The CPU 51 determines whether the measured substantial voltage is obtained for all the electric power profiles obtained in S11 (S223). When it is determined that the measured substantial voltage is not obtained for all the electric power profiles (S223: NO), the CPU 51 adds 1 to the value of the variable i (S224), and returns the processing to S213. The CPU 51 repeats the processing of S213, S13, S21, S22, S223 and S224 until the measured substantial voltage is obtained for all the electric power profiles. When it is determined that the measured substantial voltage is obtained for all the electric power profiles (S223: YES), the CPU 51 shifts the processing to S32.

As described above, the printing apparatus 1 includes the printing head 21, the pseudo-circuit 43 having the electric resistivity based on the printing head 21, the voltage detector 44, and the controller 50. The voltage detector 44 detects the substantial voltage that is lowered due to the voltage drop. The CPU 51 of the controller 50 obtains the plurality of electric power profiles from the external power supply 99 (S11). The CPU 51 decides the tentative electric power profile from the obtained electric power profiles (S12). The CPU 51 outputs the tentative electric power request instruction to the external power supply 99 so as to output the power supply electric power (power supply voltage) indicated by the tentative electric power profile (S13). The CPU 51 energizes the pseudo-circuit 43 with the power supply electric power indicated by the tentative electric power profile (S21). The CPU 51 obtains the measured substantial voltage from the voltage detector 44 (S22). The CPU 51 decides the substantial voltages in the electric power profiles except the tentative electric power profile, based on the obtained measured substantial voltage (S31). The CPU 51 derives the operation modes, based on the substantial voltage (S32), and decides the power supply voltage that is output by the external power supply 99 (S42, S43). The CPU 51 outputs the power supply electric power request instruction to the external power supply 99 so as to output the decided power supply electric power (S51).

In this way, the printing apparatus 1 decides the substantial electric power that is supplied from the external power supply 99 during printing, and decides the power supply electric power that is output by the external power supply 99, based on the substantial electric power. Therefore, the printing apparatus 1 can receive the appropriate electric power, in which the voltage drop during printing is considered, from the external power supply 99.

In the main processing of the second embodiment, the CPU 51 decides, as the tentative electric power profile, the electric power profile whose profile number is the same value as the variable i until the measured substantial voltage is obtained for all the electric power profiles (S213), outputs the tentative electric power request instruction to the external power supply 99 (S13), executes the energization processing to energize the pseudo-circuit 43 (S21), and obtains the measured substantial voltage from the voltage detector 44 (S22). Thereby, the printing apparatus 1 can decide accurately the substantial voltage in each voltage profile.

The printing apparatus 1 includes the flash memory 54. In the flash memory 54, the operation mode table 92 is stored. In the operation mode table 92, the operation mode indicative of an operation that is executed by the printing apparatus 1 and the necessary voltage of the operation mode are associated with each other. The CPU 51 automatically decides the operation mode that is executed by the printing apparatus 1, based on the substantial voltage and the necessary voltage (S63, S73, S83, S93). The CPU 51 decides the power supply electric power that is output by the external power supply 99, based on the substantial voltage and the operation mode to be executed (S64, S74, S84, S94). Thereby, the printing apparatus 1 can decide the operation mode that can be automatically executed, and request the external power supply 99 to output a voltage necessary to execute the operation mode.

The printing apparatus 1 includes the input interface 5 configured to input a receiving result of a user's operation to the CPU 51. The CPU 51 receives the operation result by the user on the input interface 5, and sets the operation mode that is executed by the printing apparatus 1 according to the operation result (S3). The CPU 51 decides the power supply electric power that is output by the external power supply 99, based on the substantial voltage and the operation mode to be executed (S104, S114, S124, S134). Thereby, the printing apparatus 1 can set the user's desired operation mode, and request the external power supply 99 to output a voltage necessary to execute the operation mode.

The CPU 51 decides, as the power supply electric power that is output by the external power supply 99, the power supply electric power indicated by the electric power profile having the lowest power supply voltage among the electric power profiles whose substantial voltages are equal to or higher than the necessary voltage of the decided operation mode (S64, S74, S84, S104, S114, S124). In this case, the printing apparatus 1 can request the external power supply 99 to output a minimum voltage for executing the operation mode. Since the printing apparatus 1 does not request an unnecessarily high voltage from the external power supply 99, the convenience is improved when the external power supply 99 supplies electric power to a device different from the printing apparatus 1.

The operation modes stored in the operation mode table 92 include the first mode and the second mode that are operation modes relating to operations at the time of printing (the high-quality printing, the energy saving printing, and the like). In this case, since the printing apparatus 1 receives electric power in consideration of the voltage drop during printing, the printing apparatus 1 can execute more securely the operation modes.

In the first mode and the second mode, the necessary voltages are different from each other. In this case, since the printing apparatus 1 receives electric power in consideration of the voltage drop during printing, the printing apparatus 1 can execute more securely the operations at the time of printing (the high-quality printing, the energy saving printing, and the like).

The printing apparatus 1 includes the USB connector 91 that is connected to the external power supply 99 with connection conforming to the USB PD standards. The electric power profiles conform to the power rules in the USB PD standards. The printing head 21 is supplied with the electric power from the external power supply 99 via the USB connector 91. In this case, the printing apparatus 1 is connected to the external power supply 99 with connection conforming to the USB PD, which improves convenience.

In the above embodiment, the electric power profile corresponds to the "voltage information" of the present disclosure. The voltage detector 44 corresponds to the "detector" of the present disclosure. The controller 50 (CPU 51) that executes the processing of S1l corresponds to the "information obtaining unit" of the present disclosure. The controller 50 (CPU 51) that executes the processing of S12 corresponds to the "tentative voltage decision unit" of the present disclosure. The controller 50 (CPU 51) that executes the processing of S13 corresponds to the "tentative request unit" of the present disclosure. The controller 50 (CPU 51) that executes the processing of S21 corresponds to the "resistor energization unit" of the present disclosure. The controller 50 (CPU 51) that executes the processing of S31 corresponds to the "substantial voltage decision unit" of the present disclosure. The power supply voltage that is output by the external power supply 99 corresponds to the "electric power supply voltage" of the present disclosure. The controller 50 (CPU 51) that executes the processing of S42 and S43 corresponds to the "electric power supply voltage decision unit" of the present disclosure. The controller 50 (CPU 51) that executes the processing of S51 corresponds to the "electric power supply request unit" of the present disclosure.

The flash memory 54 corresponds to the "storage" of the present disclosure. The operation mode that is executed by the printing apparatus 1 corresponds to the "execution operation mode" of the present disclosure. The controller 50 (CPU 51) that executes the processing of S63, S73, S83 and S93 corresponds to the "mode decision unit" of the present disclosure. The input interface 5 corresponds to the "interface" of the present disclosure. The controller 50 (CPU 51) that executes the processing of S3 corresponds to the "mode setting unit" of the present disclosure. The first mode and the second mode correspond to the "printing operation mode" of the present disclosure. The USB connector 91 corresponds to the "USB port" of the present disclosure.

The present invention is not limited to the above embodiment, and a variety of changes can be made without departing from the gist of the present invention. For example, following changes may be made as appropriate. The following changes may also be combined as appropriate.

The printing apparatus 1 may not include the pseudo-circuit 43. In this case, the CPU 51 may switch the switch 35 and the FET 32 to the ON state for energizing the printing head 21, in the energization processing (S21). In this case, the controller 50 (CPU 51) that executes the processing of S21 corresponds to the "head energization unit" of the present disclosure.

The printing apparatus 1 includes the printing head 21, the pseudo-circuit 43 having the electric resistivity based on the printing head 21, the voltage detector 44, and the controller 50. The voltage detector 44 is configured to detect the substantial voltage that is lowered due to the voltage drop. The CPU 51 of the controller 50 obtains the plurality of electric power profiles from the external power supply 99 (S11). The CPU 51 decides the tentative electric power profile from the obtained electric power profiles (S12). The CPU 51 outputs the tentative electric power request instruction to the external power supply 99 so as to output the power supply electric power (power supply voltage) indicated by the tentative electric power profile (S13). The CPU 51 energizes the printing head 21 with the power supply electric power indicated by the tentative electric power profile (S21). The CPU 51 obtains the measured substantial voltage from the voltage detector 44 (S22). The CPU 51 decides the substantial voltages in the electric power profiles except the tentative electric power profile, based on the obtained measured substantial voltage (S31). The CPU 51 derives the operation modes, based on the substantial voltages (S32), and decides the power supply voltage that is output by the external power supply 99 (S42, S43). The CPU 51 outputs the power supply electric power request instruction to the external power supply 99 so as to output the decided power supply electric power (S51).

In this way, the printing apparatus 1 decides the substantial electric power that is supplied from the external power supply 99 during printing, and decides the power supply electric power that is output by the external power supply 99, based on the substantial electric power. Therefore, the printing apparatus 1 can receive the appropriate electric power, in which the voltage drop during printing is considered, from the external power supply 99.

In the main processing of the second embodiment, the CPU 51 decides, as the tentative electric power profile, the electric power profile whose profile number is the same value as the variable i until the measured substantial voltage is obtained for all the electric power profiles (S213), outputs the tentative electric power request instruction to the external power supply 99 (S13), executes the energization processing to energize the printing head 21 (S21), and obtains the measured substantial voltage from the voltage detector 44 (S22). Thereby, the printing apparatus 1 can decide accurately the substantial voltage in each voltage profile.

The present disclosure can be further diversely changed. The configuration and number of the printing apparatus 1 may also be changed as appropriate. The USB PD controller 80 may be a single hardware body or may include software. For example, the USB PD controller 80 may include a CPU, and some of the main processing may be executed by the CPU of the USB PD controller 80. The first line 36, the second line 37 and the third line 38 may be provided with switches different from the FETs 32, 34 and 62. The FETs 32, 34 and 62 are not limited to the switching elements, and may be each a relay switch, for example.

The voltage detector 44 may also be configured to detect the voltage drop in the pseudo-circuit 43 or the printing head 21, for example, not the voltage that is relayed by the USB connector 91. At this time, the CPU 51 may be configured to detect the substantial voltage, based on the voltage drop in the pseudo-circuit 43 or the printing head 21. In this case, the CPU 51 configured to detect the substantial voltage based on the detection result of the voltage detector 44 corresponds to the "detector" of the present disclosure.

In the above embodiment, the printing apparatus 1 is connected to the external power supply 99 with connection conforming to the USB PD standards. However, the present disclosure is not limited thereto. For example, the printing apparatus 1 may be connected to the external power supply 99 with connection conforming to USB BC (USB Battery Charge) or with connection other than the USB standards. When the printing apparatus 1 is connected to the external power supply 99 with connection other than the USB standards, the printing apparatus 1 may not include the USB connector 91.

The electric resistivity of the pseudo-circuit 43 may be changed as appropriate as long as it is the "electric resistivity based on the printing head 21". The "electric resistivity based on the printing head 21" may be an integer multiple of the electric resistivity based on the printing head 21, for example.

Each processing of the printing apparatus 1 is not limited to the example where it is executed by the CPU 51. For example, some or all of the processing may be executed by another electronic device (for example, ASIC). Each processing of the printing apparatus 1 may be executed in a distributed manner by a plurality of electronic devices (for example, a plurality of CPUs). For example, some of the power supply electric power decision processing may be executed by the CPU 51.

The program including a command for causing the CPU 51 to execute processing may be stored in the storage device of the apparatus until the CPU 51 executes the program. Therefore, an obtaining method and an obtaining route of the program and the device in which the program is stored may be changed as appropriate. The program that is executed in the printing apparatus 1 may be received from another apparatus via a cable or wireless communication, and may be stored in a storage device such as the flash memory 54. Another apparatus includes a PC and a server connected via a network, for example.

The steps of each processing of the printing apparatus 1 may be changed in order, omitted or added, as required. An aspect where an operating system (OS) and the like operating on the printing apparatus 1 perform some or all of the processing based on commands from the CPU 51 of the printing apparatus 1 is also included within the scope of the present disclosure.

In the main processing, only one of the automatic setting and the manual setting may also be set. In the processing at the time of the manual setting, when the obtained electric power profiles do not include an electric power profile capable of executing the operation mode selected manually by the user, the CPU 51 may shift the processing to S131. In the main processing of the first embodiment, the CPU 51 may also decide the substantial voltage by a method other than the first method and the second method. For example, as for the substantial voltage, the substantial voltage in the electric power profile whose power supply voltage is equal to or larger than a predetermined value may be decided by the first method, and the substantial voltage in the electric power profile whose power supply voltage is smaller than the predetermined value may be decided by the second method. In the main processing of the second embodiment, the CPU 51 may decide the voltage drop, based on the measured substantial voltage obtained from the voltage detector 44.

As discussed above, the present disclosure may provide at least the following illustrative, non-limiting aspects.

Until the substantial voltage is decided for all the voltage information obtained, the controller may be configured to: decide, as the tentative voltage, a voltage corresponding to any other one of the plurality of voltage information; request the external power supply to output the tentative voltage; energize the resistor with the tentative voltage that is supplied from the external power supply; and decide the substantial voltage, based on the detection result of the detector during the energizing of the resistor. Therefore, the printing apparatus can accurately decide the substantial voltage in each of the voltage information.

Until the substantial voltage is decided for all the voltage information obtained, the controller may be configured to: decide, as the tentative voltage, a voltage corresponding to any other one of the plurality of voltage information; request the external power supply to output the tentative voltage; energize the printing head with the tentative voltage that is supplied from the external power supply; and decide the substantial voltage, based on the detection result of the detector during the energizing of the printing head. In this way, the printing apparatus decides the substantial voltage in each of the voltage information by energizing the resistor with the voltages corresponding to all the voltage information. Therefore, the printing apparatus can accurately decide the substantial voltage in each of the voltage information.

The printing apparatus may further include a storage storing necessary voltages, the necessary voltages being necessary to execute each of a plurality of operation modes in which operations are different, the storage storing the necessary voltages for each of the operation modes. The controller may be further configured to decide, as an execution operation mode, one of the plurality of operation modes, based on the substantial voltages and the necessary voltages stored in the storage. In the deciding of the electric power supply voltage, the controller may be configured to decide the electric power supply voltage, based on the substantial voltages and the execution operation mode. Thereby, the printing apparatus can decide the operation mode that can be automatically executed, and request the external power supply to output a voltage necessary to execute the operation mode.

The printing apparatus may further include a storage storing necessary voltages, the necessary voltages being necessary to execute each of a plurality of operation modes in which operations are different, the storage storing the necessary voltages for each of the operation modes; and an interface configured to receive a user's operation to set any one of the plurality of operation modes as an execution operation mode. The controller may be further configured to set the execution operation mode, based on an instruction from the interface. In the deciding of the electric power supply voltage, the controller may be configured to decide the electric power supply voltage, based on the substantial voltages and the necessary voltage for the execution operation mode stored in the storage. Thereby, the printing apparatus can set the user's desired operation mode, and request the external power supply to output a voltage necessary to execute the operation mode.

In the deciding of the electric power supply voltage, the controller may be configured to decide, as the electric power supply voltage, the voltage information indicating a minimum voltage from among the voltage information indicating voltages of being equal to or higher than the necessary voltage of the execution operation mode. In this case, the printing apparatus can request the external power supply to output the minimum voltage necessary to execute the operation mode. Since the printing apparatus does not request an unnecessarily high voltage from the external power supply, the convenience is improved when the external power supply supplies electric power to a device different from the printing apparatus.

The plurality of operation modes may include a printing operation mode relating to an operation at the time of performing the printing. In this case, since the printing apparatus receives electric power in consideration of the voltage drop during printing, the printing apparatus can more securely execute the printing operation mode.

The printing operation mode may be provided in plural, and the plurality of printing operation modes may have different voltages necessary at the time of performing the printing. In this case, since the printing apparatus receives electric power in consideration of the voltage drop during printing, the printing apparatus can more securely execute any one of the plurality of printing operation modes in which the necessary voltages are different.

The printing apparatus may further include a Universal Serial Bus (USB) port connectable to the external power supply with connection conforming to Universal Serial Bus Power Delivery (USB PD) standards. The plurality of voltage information may be information indicative of voltages conforming to the USB PD standards. The printing head may be supplied with the electric power from the external power supply via the USB port. In this case, the printing apparatus is connected to the external power supply with connection conforming to USB PD, which improves convenience.

What is claimed is:

1. A printing apparatus connectable to an external power supply, the external power supply having a plurality of voltage information and configured to output a voltage corresponding to any one of the plurality of voltage information, the printing apparatus comprising:
   a printing head configured to perform printing on a printing medium by electric power that is supplied from the external power supply;
   a resistor having an electric resistivity based on the printing head;
   a detector configured to detect a substantial voltage that is substantially supplied from the external power supply, a voltage output from the external power supply being lowered to the substantial voltage due to a voltage drop during the printing by the printing head in a case the resistor is energized with the electric power supplied from the external power supply; and
   a controller configured to:
      obtain the plurality of voltage information from the external power supply;
      decide, as a tentative voltage, a voltage corresponding to any one of the plurality of voltage information;
      request the external power supply to output the tentative voltage;
      energize the resistor with the tentative voltage that is supplied from the external power supply;
      decide the substantial voltage on a condition that a voltage corresponding to each of the voltage information obtained from the external power supply is supplied, based on a detection result of the detector during the energizing of the resistor;
      decide, as an electric power supply voltage, a voltage corresponding to any one of the plurality of voltage information, based on the substantial voltages; and
      request the external power supply to output the electric power supply voltage.

2. The printing apparatus according to claim 1, wherein until the substantial voltage is decided for all the voltage information obtained, the controller is configured to:
   decide, as the tentative voltage, a voltage corresponding to any other one of the plurality of voltage information;
   request the external power supply to output the tentative voltage;
   energize the resistor with the tentative voltage that is supplied from the external power supply; and
   decide the substantial voltage, based on the detection result of the detector during the energizing of the resistor.

3. The printing apparatus according to claim 1, further comprising:
   a storage storing necessary voltages, the necessary voltages being necessary to execute each of a plurality of operation modes in which operations are different, the storage storing the necessary voltages for each of the operation modes,
   wherein the controller is further configured to decide, as an execution operation mode, one of the plurality of operation modes, based on the substantial voltages and the necessary voltages stored in the storage, and
   wherein in the deciding of the electric power supply voltage, the controller is configured to decide the electric power supply voltage, based on the substantial voltages and the execution operation mode.

4. The printing apparatus according to claim 3, wherein in the deciding of the electric power supply voltage, the controller is configured to decide, as the electric power supply voltage, the voltage information indicating a minimum voltage from among the voltage information indicating voltages of being equal to or higher than the necessary voltage of the execution operation mode.

5. The printing apparatus according to claim 3, wherein the plurality of operation modes includes a printing operation mode relating to an operation at the time of performing the printing.

6. The printing apparatus according to claim 5,
   wherein the printing operation mode is provided in plural, and
   wherein the plurality of printing operation modes has different voltages necessary at the time of performing the printing.

7. The printing apparatus according to claim 1, further comprising:
   a storage storing necessary voltages, the necessary voltages being necessary to execute each of a plurality of operation modes in which operations are different, the storage storing the necessary voltages for each of the operation modes; and
   an interface configured to receive a user's operation to set any one of the plurality of operation modes as an execution operation mode,
   wherein the controller is further configured to set the execution operation mode, based on an instruction from the interface, and
   wherein in the deciding of the electric power supply voltage, the controller is configured to decide the electric power supply voltage, based on the substantial voltages and the necessary voltage for the execution operation mode stored in the storage.

8. The printing apparatus according to claim 7, wherein in the deciding of the electric power supply voltage, the controller is configured to decide, as the electric power supply voltage, the voltage information indicating a minimum voltage from among the voltage information indicating voltages of being equal to or higher than the necessary voltage of the execution operation mode.

9. The printing apparatus according to claim 7, wherein the plurality of operation modes includes a printing operation mode relating to an operation at the time of performing the printing.

10. The printing apparatus according to claim 9,
wherein the printing operation mode is provided in plural, and
wherein the plurality of printing operation modes has different voltages necessary at the time of performing the printing.

11. The printing apparatus according to claim 1, further comprising:
a Universal Serial Bus (USB) port connectable to the external power supply with connection conforming to Universal Serial Bus Power Delivery (USB PD) standards,
wherein the plurality of voltage information is information indicative of voltages conforming to the USB PD standards, and
wherein the printing head is supplied with the electric power from the external power supply via the USB port.

12. A printing apparatus connectable to an external power supply, the external power supply having a plurality of voltage information and configured to output a voltage corresponding to any one of the plurality of voltage information, the printing apparatus comprising:
a printing head configured to perform printing on a printing medium by electric power that is supplied from the external power supply;
a detector configured to detect a substantial voltage that is substantially supplied from the external power supply, a voltage output from the external power supply being lowered to the substantial voltage due to a voltage drop during the printing by the printing head in a case the printing head is energized with the electric power supplied from the external power supply; and
a controller configured to:
obtain the plurality of voltage information from the external power supply;
decide, as a tentative voltage, a voltage corresponding to any one of the plurality of voltage information;
request the external power supply to output the tentative voltage;
energize the printing head with the tentative voltage that is supplied from the external power supply;
decide the substantial voltage on a condition that a voltage corresponding to each of the voltage information obtained from the external power supply is supplied, based on a detection result of the detector during the energizing of the printing head;
decide, as an electric power supply voltage, a voltage corresponding to any one of the plurality of voltage information, based on the substantial voltages; and
request the external power supply to output the electric power supply voltage.

13. The printing apparatus according to claim 12, wherein until the substantial voltage is decided for all the voltage information obtained, the controller is configured to:
decide, as the tentative voltage, a voltage corresponding to any other one of the plurality of voltage information;
request the external power supply to output the tentative voltage;
energize the printing head with the tentative voltage that is supplied from the external power supply; and
decide the substantial voltage, based on the detection result of the detector during the energizing of the printing head.

14. The printing apparatus according to claim 12, further comprising:
a storage storing necessary voltages, the necessary voltages being necessary to execute each of a plurality of operation modes in which operations are different, the storage storing the necessary voltages for each of the operation modes,
wherein the controller is further configured to decide, as an execution operation mode, one of the plurality of operation modes, based on the substantial voltages and the necessary voltages stored in the storage, and
wherein in the deciding of the electric power supply voltage, the controller is configured to decide the electric power supply voltage, based on the substantial voltages and the execution operation mode.

15. The printing apparatus according to claim 14, wherein in the deciding of the electric power supply voltage, the controller is configured to decide, as the electric power supply voltage, the voltage information indicating a minimum voltage from among the voltage information indicating voltages of being equal to or higher than the necessary voltage of the execution operation mode.

16. The printing apparatus according to claim 14, wherein the plurality of operation modes includes a printing operation mode relating to an operation at the time of performing the printing.

17. The printing apparatus according to claim 16,
wherein the printing operation mode is provided in plural, and
wherein the plurality of printing operation modes has different voltages necessary at the time of performing the printing.

18. The printing apparatus according to claim 12, further comprising:
a storage storing necessary voltages, the necessary voltages being necessary to execute each of a plurality of operation modes in which operations are different, the storage storing the necessary voltages for each of the operation modes; and
an interface configured to receive a user's operation to set any one of the plurality of operation modes as an execution operation mode,
wherein the controller is further configured to set the execution operation mode, based on an instruction from the interface, and
wherein in the deciding of the electric power supply voltage, the controller is configured to decide the electric power supply voltage, based on the substantial voltages and the necessary voltage for the execution operation mode stored in the storage.

19. The printing apparatus according to claim 18, wherein in the deciding of the electric power supply voltage, the controller is configured to decide, as the electric power supply voltage, the voltage information indicating a minimum voltage from among the voltage information indicating voltages of being equal to or higher than the necessary voltage of the execution operation mode.

20. The printing apparatus according to claim 18, wherein the plurality of operation modes includes a printing operation mode relating to an operation at the time of performing the printing.

21. The printing apparatus according to claim 20,
   wherein the printing operation mode is provided in plural, and
   wherein the plurality of printing operation modes has different voltages necessary at the time of performing the printing.

22. The printing apparatus according to claim 12, further comprising:
   a Universal Serial Bus (USB) port connectable to the external power supply with connection conforming to Universal Serial Bus Power Delivery (USB PD) standards,
   wherein the plurality of voltage information is information indicative of voltages conforming to the USB PD standards, and
   wherein the printing head is supplied with the electric power from the external power supply via the USB port.

* * * * *